United States Patent [19]

Prochnow

[11] 4,306,792

[45] Dec. 22, 1981

[54] CAMERA WITH AUTOMATIC FLASH POWER LEVEL SELECTION

[75] Inventor: Claus Prochnow, Braunschweig, Fed. Rep. of Germany

[73] Assignee: Rollei-Werke Franke & Heidecke GmbH, Braunschweig, Fed. Rep. of Germany

[21] Appl. No.: 98,862

[22] Filed: Nov. 30, 1979

[30] Foreign Application Priority Data

Jan. 8, 1979 [DE] Fed. Rep. of Germany ....... 2900411

[51] Int. Cl.³ .............................................. G03B 15/05
[52] U.S. Cl. .................................... 354/127; 354/145; 354/198
[58] Field of Search ............... 354/127, 128, 145, 198, 354/289

[56] References Cited

U.S. PATENT DOCUMENTS 3,296,947  1/1967  Engelsmann et al. .............. 354/127

FOREIGN PATENT DOCUMENTS 1095762  12/1967  United Kingdom .
1111935   5/1968   United Kingdom .
1116852   6/1968   United Kingdom .
1207113   9/1970   United Kingdom .
1295204  11/1972   United Kingdom .
1339579  12/1973   United Kingdom .
1386362   3/1975   United Kingdom .
1530803  11/1978   United Kingdom .

Primary Examiner—John Gonzales
Attorney, Agent, or Firm—Schwartz, Jeffery, Schwaab, Mack, Blumenthal & Koch

[57] ABSTRACT

Disclosed is a camera having a flash unit with at least two flash power levels. A distance adjustment also used for focusing the lens of the camera and a film sensitivity adjustment combine to position a switch which selects the correct one of the flash power levels for correct exposure of the film. In preferred embodiments, a range indicator, based on the film sensitivity, indicates the distance range over which the various power levels of the flash unit can correctly expose the film. Focusing the camera lens also moves an indicator which, if within the range, selects the appropriate power level for operation when a picture is to be taken.

11 Claims, 4 Drawing Figures

| DIN | LEVEL I<br>LZ 7 | LEVEL II<br>LZ 10 | LEVEL III<br>LZ 14 |
|---|---|---|---|
| 15 | - | - | 1 - 1,2 |
| 18 | - | 1 - 1,2 | 1,3 - 1,7 |
| 21 | 1 - 1,2 | 1,3 - 1,7 | 1,8 - 2,5 |
| 24 | 1,3 - 1,7 | 1,8 - 2,5 | 2,6 - 3,5 |
| 27 | 1,8 - 2,5 | 2,6 - 3,5 | 3,6 - 5 |
| 30 | 2,6 - 3,5 | 3,6 - 5 | 5,1 - 7 |

中文 1

CAMERA WITH AUTOMATIC FLASH POWER LEVEL SELECTION

BACKGROUND OF THE INVENTION

The invention concerns in general a photographic imaging device and in particular a still camera and an electronic flash unit.

Electronic flash units having three power stages are known. They are capable of being combined with a still camera to produce a photographic imaging device. The variations in power stages makes it possible to adjust the luminous power of the flash unit rather accurately to accommodate variations in the focal distance and/or the diaphragm setting desired. Depending upon which power stage is activated, the flash unit has a different guide number presuming the sensitivity of the film remains constant. The guide number is equal to the product of the diaphragm aperture number, and the distance and thus a single guide number will have many different combinations of aperture and distance settings. These combinations may be taken from one or several tables and set manually on the flash unit (power stage switch) and on the camera (distance and aperture settings).

This manual setting of the flash power level is laborious and time consuming for the user and does not permit a rapid sequence of pictures to be taken of objects located at different distances. Additionally, the tables necessary for the determination of the exact amounts of light require considerable mental effort by the user and can lead to multiple errors which results in incorrectly exposed photographic images.

Electronic flash units are also known which can be combined with a camera and are equipped with an automatic exposure meter and a flash limiting device. In these so-called "computer flash units," the light emitted by the flash tube and reflected by the object of the camera is measured. The emission of the flash is automatically interrupted following the emission of a predetermined value required for the accurate exposure of the photographic image. Such computer flash units require circuitry of considerable complexity, which is reflected in the relatively high price of such instruments. Furthermore, such computer flash units operate within a rigidly predetermined range of distances. At a given film sensitivity, a certain "working aperture" must therefore be set. If the film sensitivity is changed and the distance range remains constant, the so-called "working aperture" must be adjusted to the different film sensitivity.

With these computer flash units there is again a so-called "aperture number calculator" provided in the form of a table, whereby the aperture setting corresponding to the given sensitivity of the film may be determined. The table also indicates the maximum distance permissible for the aperture setting determined. The aperture number must be set on the camera, together with the distance desired, which must be set on the camera, which must be less than the maximum distance given in the table. With the computer flash units of this type it is therefore again necessary to laboriously determine the values to be set on the camera when using the flash unit. This is inconvenient and time consuming and because of the mental involvement of the user and the transfer of values to the camera, the process can generate a multitude of sources of error, ultimately leading to incorrectly exposed images.

SUMMARY OF THE INVENTION

It is therefore an object of the invention to provide a photographic imaging device including a still camera and an electronic flash unit which has at least two power stages and provides the accurate exposure of photographic film. It is a further object to provide a camera suitable for simple and inexpensive manufacturing. It is a still further object to simplify the handling of the settings of the camera and the flash unit to eliminate incorrect exposures.

The above and other objects are achieved by providing a camera with an electronic flash unit having at least two power levels, a viewfinder, a variable focus objective lens, and a means indicating the focal distance of the lens to an operator of the camera. The electronic flash unit includes a means for providing an indication of the focal distance of the camera, a means for indicating the sensitivity of the film, and a means, responsive to both the film sensitivity adjusting means and the focal distance adjusting means, for selecting the correct one of the at least two power levels for correct flash exposure of the film.

DESCRIPTION OF THE DRAWINGS

A more complete appreciation of the invention and the attendant advantages thereof will be more clearly understood by reference to the following drawings wherein.

DETAILED DESCRIPTION OF PREFERRED EMBODIMENTS

Figure 1:
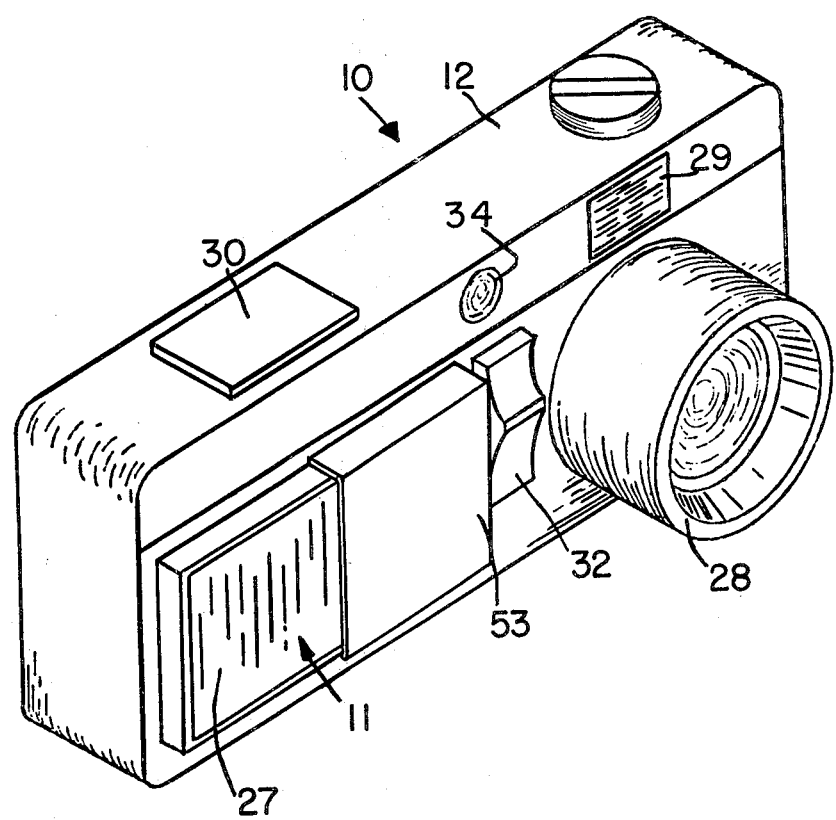
FIG. 1 is a front perspective view of a photographic imaging device according to the present invention.

The present invention has as a primary result the substantial easing of the handling procedure for a flash equipped camera. The user is required, as in the past, to set the film sensitivity of film used in the camera by means of the film sensitivity adjustment. The view finder of the camera will then immediately and clearly indicate the range of distances in which the electronic flash unit will provide adequate exposure of the object at the preset film sensitivity. It is then necessary to set the estimated focal distance to the object of the exposure on the camera and at the same time to insure that the focal distance set, as indicated in the range finder, does not exceed the upper or lower limits of the range displayed therein. By the setting of adjustment for the focal distance to the object, the light emission power level of the flash unit is automatically set so that the photographic image is exposed exactly as required by the film sensitivity and the distance set. The user is thus able to recognize, in a single glance through the viewfinder, the distance range set and to adjust his focal distance accordingly. The laborious searching for possible distance and diaphragm number combinations in the diaphragm calculator is eliminated, together with this source of error. Reading errors, for example, are no longer possible. As before, the user must still set the aperture. This, however, is constant for all distances and film sensitivities, such that mistakes are hardly possible especially when the corresponding aperture number is indicated on the camera in color or by notches.

The entire photographic imaging device operates when using the flash unit at a single, preferably median, setting. This insures in all exposures adequate depth of field so that for sharply focused exposures, only an estimation of the focal distance to the object by the user is necessary and no additional range finding is required. This constant median aperture in flash operations makes it possible to provide the still camera of the photographic imaging device with an automatic timing unit. As is known, the automatic timing unit determines the exposure time required for a given aperture and automatically sets this time in the camera.

The imaging device according to the invention does not require a computer but merely a storage capacitor in the flash unit, for example divided into several stages. This leads to a substantial reduction of the circuitry in the flash unit, and diminishes the production costs of the entire imaging device. The quality of the exposures, i.e. the quality of images taken with the flash unit is as good as those of the above-described computer flash devices.

There is another advantage of the imaging device according to the present invention, in that the applicable maximum focal distance range increases with the film sensitivity of the film material inserted in the camera. This renders it possible to make flash exposures at longer distances with film material of higher sensitivity with the proper exposure of the images. As mentioned above, this is not possible with the known computer flash devices, because they operate with constant exposure distances and increase the aperture number (decreasing aperture opening) with rising film sensitivities while the maximum focal distance remains the same.

These measures lead to a combination of the distance adjustment and the power level switch facilitating the preferred design layout, wherein by means of the suitable arrangement of the fixed contacts it is insured that the associated power level of the device is set for the specific distance set on the camera based upon the distance adjustment. A plurality of contacts are fixed to a contact plate which is mounted for movement in the longitudinal direction and interconnected with the distance range indicator. This results in a simple and space saving combination of the power switch, distance adjustment and distance range indicator in a single, compact structural element.

In one embodiment, the distance range indicator is mounted for movement into and out of the viewfinder when the flash unit is turned on or off, respectively. This provides that the distance range indicator is visible in the viewfinder during the use of the flash unit. The user is provided control simultaneously over normal and flash operations.

A preferred embodiment of the invention has an actuator for turning the flash unit on and off. This coupling of the actuator is also used to rotate the distance range indicator into and out of the field of view of the viewfinder to provide the user of the camera a signal indicative of whether the flash unit is on or off. Only when the flash unit is turned on, is the distance range indicator visible to the user in the viewfinder.

Referring now to the drawings wherein like reference characters designate like parts throughout the several views, FIG. 1 shows a still camera 10 and an electronic flash unit 11, located in the common housing 12. The electronic flash unit 11, schematically shown in FIG. 3, comprises in the conventional manner a flash tube 13, which together with storage capacitor 14, forms a discharge circuit. The storage capacitor 14 is charged by means of a rechargeable battery 15 to its operating voltage. An ignition device 16, comprises a pulse transformer 17 and an ignition capacitor 18, charged by way of a resistance network 18 and dischargeable through transformer 17, is activated with the shutter release by means of the synchronous contact 20. Upon the closing of the synchronous contact 20, the ignition capacitor 18 is discharged abruptly through the pulse transformer 17. The ignition pulse generated in this manner renders the flash tube 13 conductive and storage capacitor 14 is discharged through the flash tube 13 which provides a flash of light.

Figure 2:
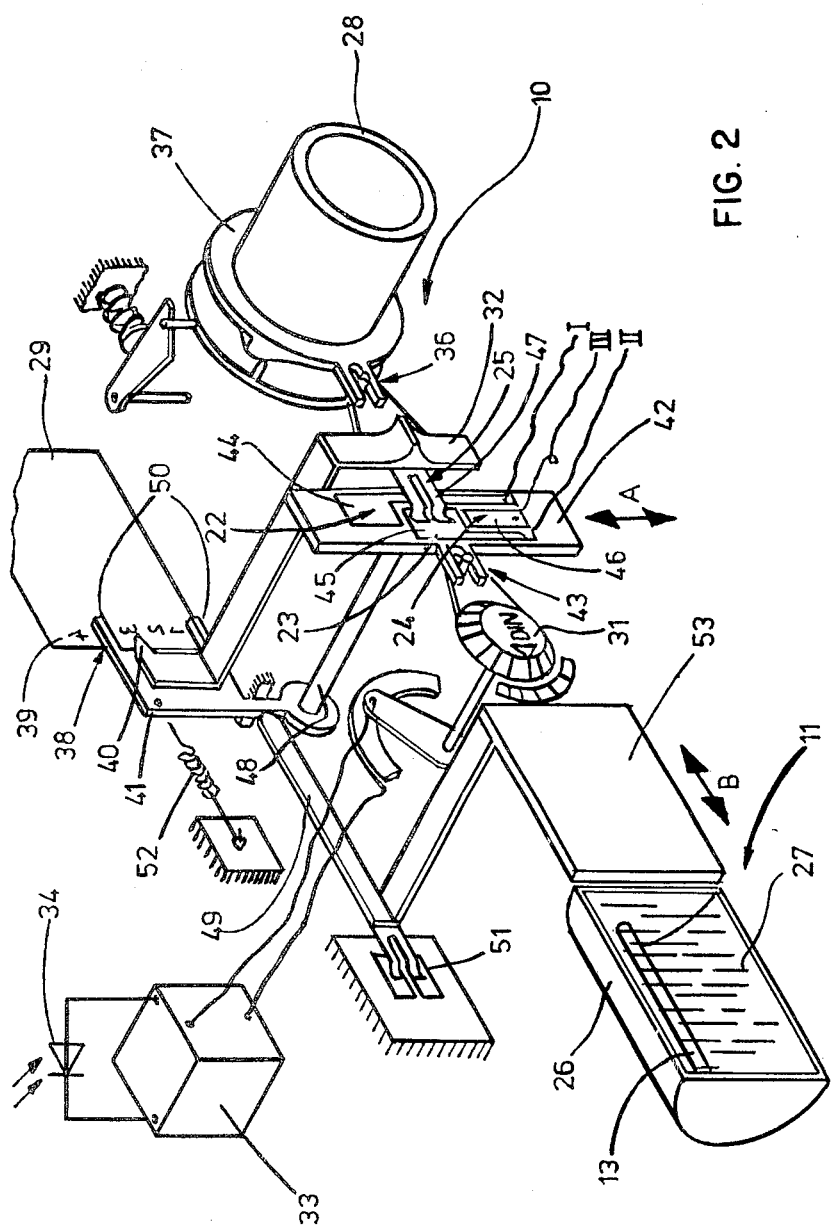
FIG. 2 is a front perspective view of some internal parts of the imaging device of FIG. 1.

The electronic flash unit 11 comprises at least two and in a preferred embodiment three, power levels. For this purpose, the storage capacitor 14 is divided into three individual condensers 141, 142 and 143. These individual condensers 141–143 are all charged to the operating voltage and may be connected selectively with the flash tube 13 by means of the power level switch 21. As shown, in the switch position I the condenser 141, in switch position II the condensers 141 and 142, and in switch position III all three condensers 141–143 are connected with the flash tube. The power level switch 21 is provided with a mounting means, for example contact plate 42, having three stationary contacts 22, 23 and 24, each contact connected with one of the condensers 141–143. Contact means, for example, mobile switching contact 25, depending on the position of the power level switch 21, contacts one of the stationary contacts 22–24 and connects the corresponding combinations of the condensers 141–143, in parallel with one another, with the flash tube 13. The flash tube 13 is arranged in a reflector 26, the aperture of which is covered with a light diffusing disk 27 as seen in FIG. 2.

FIG. 1 also shows a variable focus objective lens 28, a viewfinder 29 and a release button 30. On the front panel of the housing 12, a sensitivity adjusting means, for example film sensitivity adjustment 31 (seen in FIG. 2), and a focal distance adjusting means, for example distance setting 32, are arranged for manual operation in a freely accessible manner. As usual, the film sensitivity adjustment 31 is electrically coupled with an exposure measuring unit 33 (FIG. 2), whereby the film sensitivity value is entered as an electrical value in the exposure meter 33. The exposure meter 33 measures the ambient light by means of a photoelectric converter 34 and determines in combination with a set diaphragm aperture or set shutter speed, the shutter speed or aperture required for an exact exposure.

The distance setting 32 is mounted on the housing 12 to be movable in the longitudinal direction (parallel to the direction of arrow A). This straight line motion is converted by means of a pin-slit connection 36 into the rotational motion of a distance setting ring 37 mounted on the objective lens holder 28 of the camera (FIG. 2). In the viewfinder 29 a distance indicating device 38, is visible. The latter comprises a fixed straight line distance scale 39 and a focal distance indicating means, for example an indicator 40, rigidly connected with the distance setting 32 to indicate on the distance scale 39 the focal distance set on the camera objective lens. Further, in the distance indicating device 38, a focal distance range indicating means, for example, distance range indicator 41, visible at least during flash unit operations, is provided. The distance range indicator is coupled with the film sensitivity adjustment and controlled by the latter. Coupling is effected by means of a contact plate 42 connected with the distance range indicator 41. The contact plate 42 is mounted in the housing 12 in a longitudinally movable manner, parallel to the distance adjustment 32. The distance range indicator 41 is secured to this contact plate 42. The film sensitivity adjustment 31, designed in the form of a rotating knob, is mechanically coupled with the contact plate 42 by means of the pin-slit connection 43. The rotating motion of the film sensitivity setting 31 causes a longitudinal motion of the contact plate 42 in the direction of the arrow A in FIG. 2, whereby the distance range indicator 41 is displaced similarly.

By means of the contact plate 42, the film sensitivity adjustment 31, the distance setting 32 and the power level switch 21 are adapted to and coupled with each other. The setting of the film sensitivity adjustment 31 to the sensitivity of the film used, causes the distance range indicator 41 to set the distance range permissible for this sensitivity. With a given, preferably median, aperture in the distance range indicating device 38, the setting of the distance setting 32 to a desired focal distance causes the switch 21 to connect a flash power level which is coordinated with said distance, said film sensitivity and said given aperture. To accomplish this, the contact plate 42 carries the stationary contacts 22, 23 and 24 and the distance setting 32 carries the mobile switching contact 25 of the power level switch 21. The stationary contacts 22-24 are designed in the form of extended contact segments 44, 45 and 46, insulated from each other. The contact segments 44-46 as seen in FIG. 2 are connected with the individual condensers 141-143. The mobile switching contact 25 is in the form of a contact tongue 47, spring biased into contact with one of the contact segments 44-46 regardless of the relative position of plate 42 and the distance setting 32.

The distance range indicator 41 is secured to the contact plate 42 about an axis of rotation 48. A manually operable actuator means, for example, an actuating member 49, engages the distance range indicator 41 moving it into and out of visual proximity in the viewfinder. The distance range indicator 41 is designed in the form of a flag, with the end thereof visible in the viewfinder adjacent the distance scale 39. The width of the flag is such that with all of the film sensitivities that may be set, the permissible distance range, from the shortest to the longest distance may be read from the numerals on the distance scale which is immediately adjacent the range indicator.

The actuating member 49 is arranged displaceably in the longitudinal direction and carries a switch 51 to turn the electronic flash unit 11 on and off. The actuating member 49 is operated manually and designed so that, when the electronic flash unit 11 is switched on, the distance range indicator 41 is rotated into the distance indicator device 39 and that, with the electronic flash unit 11 in the off position, the distance range indicator is rotated out of the distance indicator device 38. The rotation, out of the distance indicating device, of the distance range indicator 41 is effected by means of a return spring 52, which is stressed by the inward rotation of the indicator 41. A cover slide 53 is additionally connected with the actuator 49, for covering the aperture of the reflector 26 closed by the light diffusing disk 27, which represents the outlet for the light of the electronic flash unit 11. The cover slide 53 may be displaced by means of the manually actuated actuator 49 in the direction of the arrow B in FIG. 2 so that with the electronic flash unit in the on position, as shown in FIG. 2, it leaves the light outlet of the electronic flash unit 11, i.e. the opening of the reflector 26, free, while completely covering it when the electronic flash unit 11 is turned off. Conveniently, the cover slide 53 travels in front of the light diffusing disk 27 so that the latter is covered during transportation of the imaging device and is thus protected against damage.

Figures 3, 4:
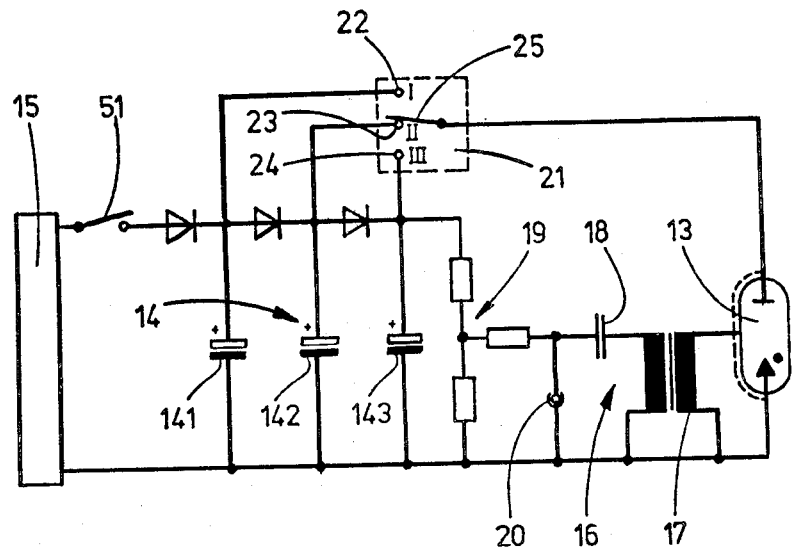
FIG. 3 is an electrical circuit diagram of the electronic flash unit contained in the imaging device of FIG. 1.
FIG. 4 is a tabular compilation of the focal distance ranges for correct exposure in accordance with film sensitivity and varying power levels of the flash unit.

FIG. 4 is a table showing the ranges available at three different flash power levels as a function of the film sensitivity. The guide numbers (LZ) were computed with reference to a film sensitivity of 21 DIN, and are 7, 10 and 14 for switch positions I, II and III, respectively. As mentioned above, a constant aperture must be set in the above-described imaging device in flash operation. Here, an aperture with a diaphragm number of 5.6 has been selected. The distance ranges (in meters) associated with a diaphragm number of 5.6 and the corresponding guide number (or switch position) may be determined from FIG. 4 in the conventional manner. Assuming a setting on the film sensitivity adjustment 31 of DIN 24 (outlined by dotted lines in FIG. 4), the mode of operation of the above-described imaging device will be explained as follows.

By the setting of the film sensitivity adjustment 31 to the film sensitivity 24 of the film material used in the still camera 10, the contact plate 42 is displaced by way of the pin-slit connection 43 in the direction of the arrow A. The diaphragm number 5.6 is set on the still camera 10 in the usual manner. The electronic flash unit 11 is still off and the distance range indicator 41 is not visible in the viewfinder 29.

In order to turn the electronic flash unit 11 on, the actuator 49 must be displaced manually in its longitudinal direction (Arrow B in FIG. 2), until the cover slide 53 completely exposes the opening of the reflector 26. In this position the switch 51 (FIGS. 2 and 3) is closed and the flash unit 11 turned on. Simultaneously, the distance range indicator 41 is rotated against the spring force of the return spring 52 into position in the viewfinder 29 and therein indicates a distance range of 1 m to 3.5 m (in agreement with the closest distance of 1 m and the longest distance of 3.5 m indicated in FIG. 4 for a film sensitivity of 24 DIN). A user looking through the viewfinder 29 now knows that with this film sensitivity of 24 DIN he may operate within a range of 1 m to 3.5 m. He estimates his distance to the object to be 2.5 m. He sets this distance by means of the distance adjustment 32 until the indicator 40 shows the distance of 2.5 m on the distance scale 39. With this displacement of the distance adjustment 32 the contact tongue 47 slides onto the contact segment 45. The mobile contact 25 is connected with the stationary contact 24 (FIG. 3) and thus level II of the electronic flash unit is switched on. This semi-automatic setting is confirmed by reference to the table in FIG. 4. If the release knob 30 is now activated, the synchronous contact 20 is closed, the flash tube 13 ignited and the two condensers 141 and 142 discharged by way of the flash tube 13. The light emitted by the flash tube 13 in this power level II of the electronic flash unit 11 results in an accurate exposure of the photographic image.

Although the invention has been described relative to a specific embodiment thereof, it is not so limited and many modifications and variations thereof will be readily apparent to those skilled in the art in light of the above teachings. For example, many more flash power levels could be utilized providing a much finer adjustment of flash power level in accordance with film sensitivity and focal distance. The indicators while located in the viewfinder in a preferred embodiment, could easily be located external to the camera housing as well. Additionally, directions of movement of the individual structures shown could be otherwise than as demonstrated. It is, therefore, to be understood that, within the scope of the appended claims, the invention may be practiced otherwise than as specifically described.

What is claimed is:

1. A photographic device for recording photographic images on film, comprising:
   an electronic flash unit having at least two power levels; and
   a camera comprising:
   a viewfinder;
   a variable focus objective lens;
   means for adjusting the focal distance of said lens;
   means for indicating the focal distance setting of said lens;
   means for adjusting said camera according to the sensitivity of the film to be used therein; and
   means, responsive to said focal distance adjusting means and to said film sensitivity adjusting means, for selecting the correct one of said flash unit power levels for proper exposure of the film at the selected film sensitivity and the selected focal distance, wherein said focal distance indicating means is located in said viewfinder and said camera further includes means, responsive to said film sensitivity adjusting means and located in said viewfinder, for indicating a range of focal distances over which proper film exposure is possible.

2. A photographic device according to claim 1, wherein said camera further includes means for simultaneously switching on said flash unit, uncovering said flash unit, and moving said focal distance range indicating means into visual proximity with said focal distance indicating means in said viewfinder.

3. A photographic device according to claim 1, wherein said selecting means comprises:
   means for mounting at least two insulated contacts thereon, said mounting means movable in response to movement of said film sensitivity adjusting means; and
   means, movable in response to movement of said focal distance indicating means, for making electrical contact with at least one of said at least two insulated contacts on said mounting means, said electrical contact selecting one of said at least two power levels of said flash unit.

4. A photographic device according to claim 3, wherein said focal distance range indicating means and said focal distance indicating means are situated in said viewfinder optically adjacent a straightline distance scale.

5. A photographic device according to claim 3, wherein said selecting means includes means for moving said mounting means in a longitudinal direction, said means for moving including means fixing said focal distance range indicating means to said mounting means.

6. A photographic device according to claim 5, wherein said film sensitivity adjusting means comprises a rotating knob engaging said moving means for movement of said mounting means in said longitudinal direction by means of a pin-slit connection.

7. A photographic device according to claim 6, wherein said flash unit includes means mounting said focal distance adjusting means for movement in a direction parallel to said longitudinal direction.

8. A photographic device according to claim 7, wherein said camera includes means for turning said flash unit on and off, and for moving said focal distance range indicating means into and out of visual proximity with said focal distance indicating means in said viewfinder, respectively.

9. A photographic device according to claim 8, wherein said flash unit includes a light outlet opening and said on and off means further includes means for uncovering and covering said light outlet opening in registration with turning said flash unit on and off.

10. A photographic device according to claim 1, wherein said focal distance adjusting means and said focal distance indicating means are interconnected with said variable focus objective lens, such that movement of said focal distance adjusting means causes a change in focal distance of said lens and a corresponding change in the indication of the focal distance by said focal distance indicating means.

11. A photographic device according to claim 1, wherein said camera and said flash unit are in a single common housing.

* * * * *